US012573180B2

(12) United States Patent
Joynt

(10) Patent No.: US 12,573,180 B2
(45) Date of Patent: Mar. 10, 2026

(54) COLLECTION OF IMAGE DATA FOR USE IN TRAINING A MACHINE-LEARNING MODEL

(71) Applicant: Insight Direct USA, Inc., Chandler, AZ (US)

(72) Inventor: Scott Joynt, Delaware, OH (US)

(73) Assignee: Insight Direct USA, Inc., Chandler, AZ (US)

( * ) Notice: Subject to any disclaimer, the term of this patent is extended or adjusted under 35 U.S.C. 154(b) by 454 days.

(21) Appl. No.: 18/212,325

(22) Filed: Jun. 21, 2023

(65) Prior Publication Data
US 2024/0428565 A1 Dec. 26, 2024

(51) Int. Cl.
*G06T 7/00* (2017.01)
*G06V 10/143* (2022.01)
*G06V 10/774* (2022.01)

(52) U.S. Cl.
CPC .......... *G06V 10/774* (2022.01); *G06T 7/0004* (2013.01); *G06V 10/143* (2022.01); *G06T 2207/20081* (2013.01)

(58) Field of Classification Search
None
See application file for complete search history.

(56) References Cited

U.S. PATENT DOCUMENTS 6,864,971 B2 3/2005 Lin et al.
8,103,085 B1 1/2012 Zadeh
9,442,076 B2 9/2016 Shepherd et al.
10,395,362 B2 8/2019 Gupta et al.
10,937,151 B2 3/2021 Wang et al.
11,112,349 B2 9/2021 Amer et al.
11,150,200 B1 10/2021 Watson et al.
11,314,906 B2 4/2022 Cristian et al.
(Continued)

FOREIGN PATENT DOCUMENTS

EP 3791336 A1 3/2021
GB 2357158 A 6/2001
(Continued)

OTHER PUBLICATIONS

Blasco, Jose, et al. "Citrus sorting by identification of the most common defects using multispectral computer vision." Journal of Food Engineering 83.3 (2007): 384-393. (Year: 2007).*
(Continued)

*Primary Examiner* — Sean M Conner
(74) *Attorney, Agent, or Firm* — Kinney & Lange, P.A.

(57) ABSTRACT
A method of collecting and conditioning image data of an item for use in training a machine-learning model to detect at least one defect can include capturing a first set of images by a first camera with each image of the first set of images having a first viewpoint of the item that is the same viewpoint as the other images in the first set of images and can be illuminated by various wavelengths of light including ultraviolet light, infrared light, and visible light. The method can further include examining one image of the first set of images to determine if the item contains at least one defect, identifying a first location of the at least one defect on the one image, designating the first location on the other images of the first set of images so that all images in the first set of images identify the first location.

20 Claims, 2 Drawing Sheets

(56)     References Cited

U.S. PATENT DOCUMENTS

| | | |
|---|---|---|
| 11,378,521 B2 | 7/2022 | Kasai et al. |
| 11,430,105 B2 | 8/2022 | Watson et al. |
| 11,605,159 B1 | 3/2023 | Do |
| 2020/0005422 A1 | 1/2020 | Subramanian et al. |
| 2020/0167905 A1* | 5/2020 | Bian ..................... G01N 21/91 |
| 2021/0334946 A1 | 10/2021 | Buzaglo |
| 2021/0379624 A1 | 12/2021 | Lu et al. |
| 2022/0335254 A1 | 10/2022 | Mccrackin et al. |
| 2023/0051895 A1 | 2/2023 | Winfree et al. |
| 2023/0237635 A1* | 7/2023 | Ganju ................. G06V 10/945 |

FOREIGN PATENT DOCUMENTS

| | | | |
|---|---|---|---|
| WO | 2019200289 A1 | 10/2019 |
| WO | 2022214853 A1 | 10/2022 |

OTHER PUBLICATIONS

Hong, Feng, et al. "A novel framework on intelligent detection for module defects of PV plant combining the visible and infrared images." Solar Energy 236 (2022): 406-416. (Year: 2022).*

* cited by examiner

100

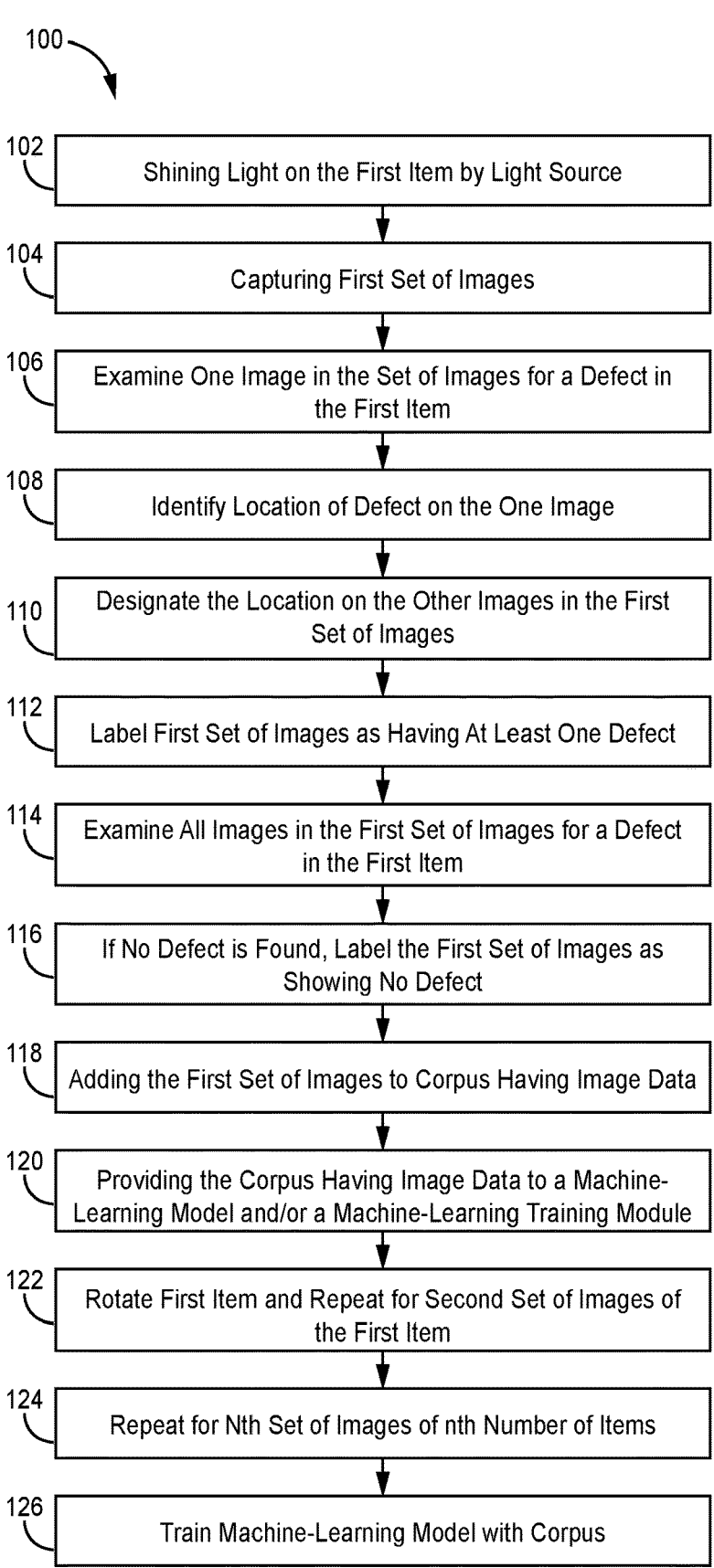

102 — Shining Light on the First Item by Light Source

104 — Capturing First Set of Images

106 — Examine One Image in the Set of Images for a Defect in the First Item

108 — Identify Location of Defect on the One Image

110 — Designate the Location on the Other Images in the First Set of Images

112 — Label First Set of Images as Having At Least One Defect

114 — Examine All Images in the First Set of Images for a Defect in the First Item 116 — If No Defect is Found, Label the First Set of Images as Showing No Defect 118 — Adding the First Set of Images to Corpus Having Image Data 120 — Providing the Corpus Having Image Data to a Machine-Learning Model and/or a Machine-Learning Training Module 122 — Rotate First Item and Repeat for Second Set of Images of the First Item 124 — Repeat for Nth Set of Images of nth Number of Items 126 — Train Machine-Learning Model with Corpus

FIG. 2

COLLECTION OF IMAGE DATA FOR USE IN TRAINING A MACHINE-LEARNING MODEL

FIELD OF THE INVENTION

The disclosure relates generally to machine-learning models and, more specifically, to the collection and conditioning of image data for use in training machine-learning models.

BACKGROUND

A machine-learning model can be used to visually examine products as part of quality control to determine if the products have any defects and/or irregularities. To train the machine-learning model to more accurately identify defects and/or irregularities, image data containing previous products/items can be used. The image data can include images of products shown in the visible light spectrum (i.e., shown by light along the light spectrum between red and violet), with those images showing both products with defects and products without defects (or at least products in which no defects can be seen in the images). Because the images used for training the machine-learning model only show the products in visible light, the machine-learning model can only identify defects that are seen under visible light, thereby limiting the accuracy of the machine-learning model.

SUMMARY

In one example, a method of collecting and conditioning image data of an item for use in training a machine-learning model to detect at least one defect is disclosed herein. The method can include capturing a first set of images by a first camera with each image of the first set of images having a first viewpoint of the item that is the same viewpoint as the other images in the first set of images, wherein the first set of images includes images capturing the item as illuminated by various wavelengths of light including ultraviolet light, infrared light, and visible light. The method can further include examining one image of the first set of images to determine if the item contains at least one defect; identifying, in response to the one image showing the item contains at least one defect, a first location of the at least one defect on the one image; designating the first location, which corresponds to the at least one defect, on the other images of the first set of images so that all images in the first set of images identify the first location; and adding the first set of images to a corpus having the image data for use in training the machine-learning model.

In another example, a system for collecting and conditioning image data of an item for use in training a machine-learning model to detect at least one defect is disclosed herein. The system can include a light source configured to shine light having different wavelengths onto the item, the light including ultraviolet light, infrared light, and visible light and a camera configured to capture a first set of images having a first viewpoint of the item that is the same viewpoint for each image in the first set of images, wherein the first set of images includes images captured at various wavelengths of light including ultraviolet light, infrared light, and visible light. The system can further include a user interface in communication with the camera to receive at least one of the first set of images, the user interface enabling examination of one image of the first set of images to determine if the item contains at least one defect and identification, in response to the determination that the one image shows at least one defect, of a first location of the at least one defect on the one image; a computer processor in communication with the user interface and configured to designate the first location on the other images of the first set of images so that all images in the first set of images identify the first location; and a corpus having image data that includes the first set of images with the corpus being used in training the machine-learning model.

BRIEF DESCRIPTION OF THE DRAWINGS

FIG. 2 is an example flow chart of the image data collection and conditioning process.

Figure 1:
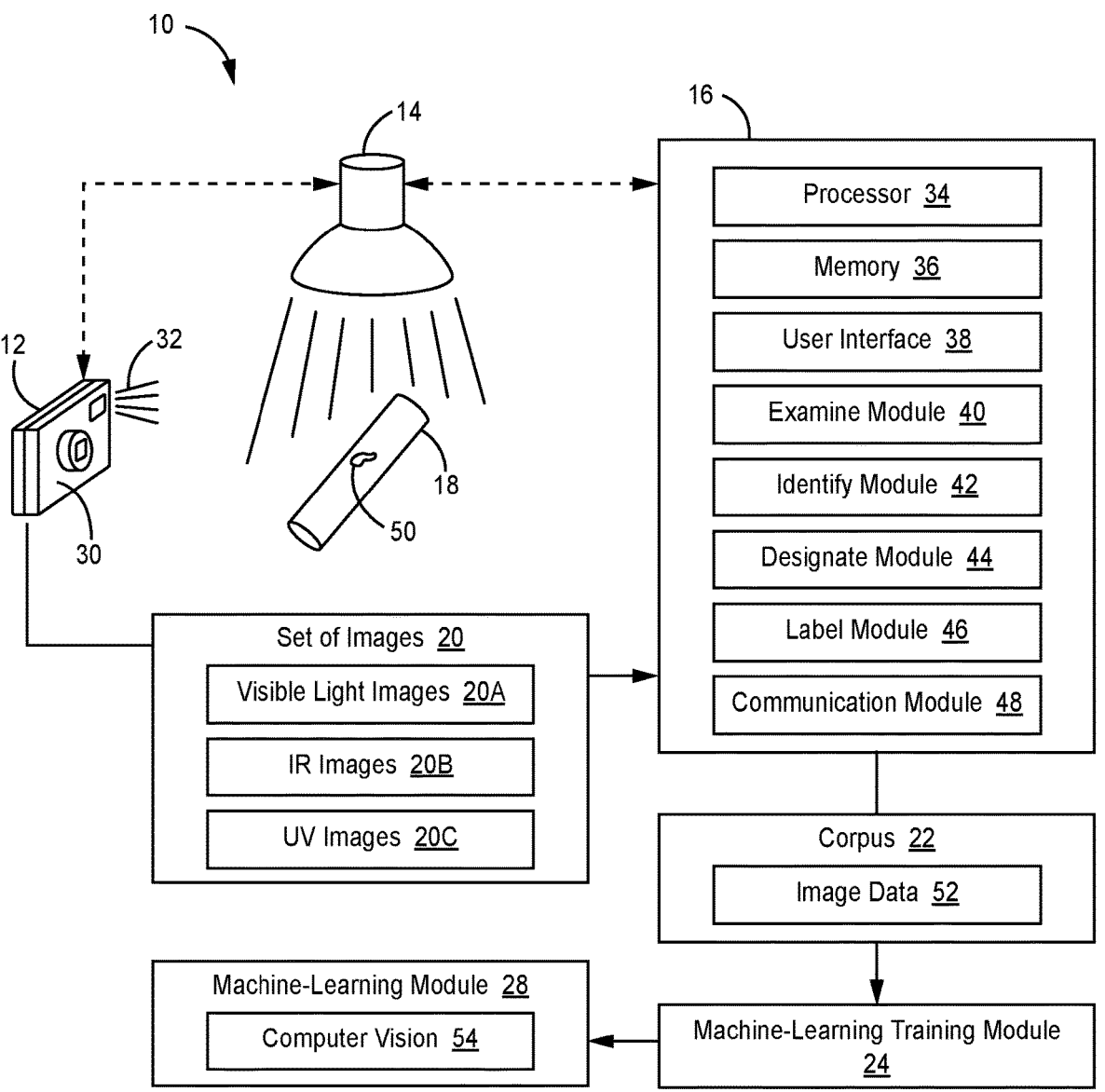
FIG. 1 is an example schematic of an image data collection system for conditioning image data for use in training a machine-learning model.

While the above-identified figures set forth one or more examples of the present disclosure, other examples/embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and examples of the present invention may include features and components not specifically shown in the drawings.

DETAILED DESCRIPTION

The process and systems described herein collect and/or condition image data for use in training a machine-learning model to identify defects in products/items. The image data can be part of a corpus, which can include any information for use in training the machine-learning model. The image data can include images of an item, which can be similar to the products/components the machine-learning model is trained to identify defects in. The images can capture the item under various wavelengths of light, such as ultraviolet light (also referred to herein as "UV light"), infrared light (also referred to herein as "IR light"), and visible light (i.e., light having wavelengths in the visible light spectrum). Images having the same viewpoint of the item under different types/wavelengths of light can be organized into sets of images. Depending on the camera, light source, and/or wavelength(s) of light shining on the item, the set of images can be collected simultaneously or in quick succession.

After the collection/capture of a set of images including images of the item shown under various wavelengths/light, at least one image in the set of images is examined to determine if the item contains at least one defect. If the image shows a defect in the item, the location of the defect can be identified in/on the image and that location can be designated in/on the other images in the set of images, even if the defect is not viewable in those particular images. This designation in the other images in the set of images is possible due to all images in the set of images having the same viewpoint of the item (so thus the defect on the item will be in the same location in all of the images in the set of images). The set of images can then be labeled as showing at least one defect and/or added to the corpus. If none of the images in the set of images show a defect in the item after examination of all of the images in the set of images, the set of images can be labeled as not showing any defects and/or added to the corpus. Thus, the corpus can include image data having sets of images that do show defects and sets of images that do not show defects. Within the set of images labeled as images that do show defects, one or multiple defects may not be viewable/visible in a particular image because the wavelengths of light captured by that image may be such that the defect(s) cannot be seen. Thus, this image data can allow the machine-learning model to be trained to determine which wavelengths of light are most useful/indicative of showing a defect in the item.

The image data having sets of images including images capturing the item under various lights/wavelengths, such as UV light, IR light, and/or visible light, has important advantages. Some defects may not be viewable under visible light, but instead are viewable under other types of light. Thus, the machine-learning model that is trained using this image data can identify defects from images having/capturing a wide range of wavelengths, even if those defects are not viewable under visible light, thereby increasing the accuracy of the machine-learning model to identify defects. This and other advantages will be realized by reviewing this disclosure.

FIG. 1 is an example schematic of image data collection system 10 for collection and conditioning of image data 52 for use in training machine-learning model 28. FIG. 2 is an example flow chart of image data collection and conditioning process 100. As shown in FIG. 1, system 10 can include camera 12, light source 14, and conditioning system 16 for detecting defects in/on item 18. Camera 32 can capture a set of images 20 having visible light images 20A, IR images 20B, and/or UV images 20C. Conditioning system 16 can condition the set of images 20 and provide corpus 22 to machine-learning training module 24, which in turn uses corpus 22 to train machine-learning model 28. Camera 12 can include housing 30 and/or internal light source 32. Conditioning system 16 can include processor 34, memory 36, user interface 38, examine module 40, identify module 42, designate module 44, label module 46, and communication module 48. Item 18 can include one or multiple defects 50. Corpus 22 can include image data 52 that includes one or multiple sets of images 20 after being conditioned (e.g., examined, defect locations identified, defect locations designated in other images 20A-20C, and/or sets of images 20 being labeled) by conditioning system 16. Machine-learning model 28 can include computer vision 54 configured to examine images of item 18 (or similar products, items, and/or components) to determine if item 18 has any defects 50. System 10 and process 100 can use any computer software and/or hardware for performing the functions described herein.

Image data collection system 10 (and the disclosed image data collection and conditioning process 100 shown and described with regards to FIG. 2) can include other steps, components, modules, configurations, and/or features not expressly disclosed herein that are suitable for capturing images 20 having item 18 shown in various different wavelengths of light, determining whether defect 50 is shown in images 20A-20C, adding the images 20A-20C to image data 52 in corpus 22, and/or other functions. For example, system 10 can include any number of digital/electronic storage media (e.g., memory 36) for storing data/information, any number of computer processors (e.g., processor 34) for performing tasks/instructions with regards to system 10, communication via wired or wireless communication methods (e.g., communication module 48) between components of system 10 and/or between other components, systems, individuals, etc. distant from system 10, and/or other components. System 10 (particularly, conditioning system 16) is described herein as including one or multiple "modules,"

which can be any hardware and/or software for performing the tasks, functionality, and/or capabilities described herein with regards to those modules. These "modules" can be instantiated in dedicated hardware, and/or can be defined functionally and use shared hardware.

Additionally, image data collection system 10 can be a discrete assembly or be formed by one or more components capable of individually or collectively implementing the functionalities described herein. In some examples, system 10 can be implemented as a plurality of discrete circuitry subassemblies. In some examples, one or all components of system 10 can include and/or be implemented at least in part on a smartphone or tablet, among other options. In some examples, one or all components of system 10 can include and/or be implemented as downloadable software in the form of a mobile application. The mobile application can be implemented on a computing device, such as a personal computer, tablet, or smartphone, among other suitable devices. One or all components of system 10 can be considered to form a single computing device even when distributed across multiple component computing devices. Image data collection system 10 can include a configuration in which one, some, or all of the functions described herein are performed by different components. System 10 can include various components for performing the above functions (as well as other functions described in this disclosure), such as processor 34, memory 36, and/or user interface 38.

Image data collection system 10 (and/or the components of system 10, such as camera 12, light source 14, and conditioning system 16 having memory 36, user interface 38, examine module 40, identify module 42, designate module 44, label module 46, and/or communication module 48) can include one or multiple computer/data processors 34 (also referred to as "processor 34"). In general, processor 34 can include any or more than one of a processor, a microprocessor, a controller, a digital signal processor (DSP), an application specific integrated circuit (ASIC), a field-programmable gate array (FPGA), or other equivalent discrete or integrated logic circuitry. Processor 34 can perform instructions stored within storage media, such as memory 36 (or located elsewhere), and/or processor 34 can include storage media such that processor 34 is able to store instructions and perform the functions described herein. Additionally, processor 34 can perform other computing processes described herein, such as the functions performed by any of the components of image data collection system 10 (including conditioning system 16).

Image data collection system 10 (and/or the components of system 10, such as camera 12, light source 14, and conditioning system 16 having processor 34, user interface 38, examine module 40, identify module 42, designate module 44, label module 46, and/or communication module 48) can also include memory 36. Memory 36 is configured to store information and, in some examples, can be described as a computer-readable storage medium. Memory 36, in some examples, is described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, memory 36 is a temporary memory. As used herein, a temporary memory refers to a memory having a primary purpose that is not long-term storage. Memory 36, in some examples, is described as volatile memory. As used herein, a volatile memory refers to a memory that that the memory does not maintain stored contents when power to memory 36 is turned off. Examples of volatile memories can include random access memories (RAM), dynamic random access memories (DRAM), static random access memories (SRAM), and other forms of volatile memories. In some examples, the memory is used to store program instructions for execution by the processor. The memory, in one example, is used by software or applications running on image data collection system 10 to temporarily store information during program execution.

Memory 36, in some examples, also includes one or more computer-readable storage media. Memory 36 can be configured to store larger amounts of information than volatile memory. Memory 36 can further be configured for long-term storage of information. In some examples, memory 36 includes non-volatile storage elements. Examples of such non-volatile storage elements can include, for example, magnetic hard discs, optical discs, floppy discs, flash memories, cloud storage media, or forms of electrically programmable memories (EPROM) or electrically erasable and programmable (EEPROM) memories. As shown in the example of image data collection system 10, memory 36 can store set of images 20, corpus 22, image data 52, and/or other information, data, and/or instructions associated with system 10.

Image data collection system 10 can also include user interface 38. User interface 38 can be an input and/or output device and enables an operator to control operation, modification, view of data, etc. of image data collection system 10, set of images 20, corpus 22, image data 52, and/or other information. For example, user interface 38 can be configured to receive inputs from an operator and/or provide outputs. User interface 38 can include one or more of a sound card, a video graphics card, a speaker, a display device (such as a liquid crystal display (LCD), a light emitting diode (LED) display, an organic light emitting diode (OLED) display, etc.), a touchscreen, a keyboard, a mouse, a joystick, and/or other type of device for facilitating input and/or output of information in a form understandable to users and/or machines. In one example, a user, operator, and/or other individual can use user interface 38 in conjunction with or in place of examine module 40 and/or identify module 42 to examine images 20 and identify a location of defect 18 on item 50 shown in images 20A-20C in the set of images 20.

Camera 12 can be any component suitable for capturing set of images 20 (e.g., including visible light images 20A, IR images 20B, and/or UV images 20C) with enough clarity to allow for identification of defects 50. Camera 12 can be configured to capture images 20A-20C that show item 50 under any wavelength of light as provided by light source 14 and/or by internal light source 32. Internal light source 32 can be within the same housing 30 as camera 12 so as to be one monolithic and continuous component. Housing 30 can be any shell/casing that is capable of containing camera 12 and/or internal light source 32 therewithin. For example, housing 30 can be a hard material, such as plastic, that protects the internal components of camera 12 and internal light source 32 while also having openings to allow for the lens of camera 12 to capture images 20A-20C and for internal light source 32 to emit light onto item 18. Camera 12 can be a generic, full spectrum camera that operates in conjunction with light source 14 (and/or internal light source 32) to capture set of images 20 with each image 20A-20C of the set of images 20 having the same viewpoint but differing images 20A-20C in the set of images 20 capturing item 18 under different light wavelengths provided by light source

14 (and/or internal light source 32). Then, either camera 12 and/or light source 14 can reposition or item 18 can reposition (e.g., rotate) so that camera 12 can capture another set of images 20 from a different viewpoint relative to item 18. Alternatively, camera 12 can be specialized to provide different wavelengths of light via internal light source 32 (so that camera 12 can capture images 20A, 20B, and/or 20C) and/or simply capture the different wavelengths of light reflected from item 18 as provided by light source 14.

Camera 12 can have any configuration, orientation, and/or location with respect to item 18 and/or light source 14 suitable for capturing set(s) of images 20 showing defects 50 in item 18. Additionally, system 10 can include more than one camera 12 to capture different sets of images 20 from different viewpoints with respect to item 18 (in addition to the repositioning of item 18 between capturing of sets of images 20 and/or alternative to repositioning item 18). Camera 12 can be any type of camera that can capture any type of images, including a full spectrum camera and/or a camera that uses rolls of film or captures digital images. Camera 12 can include manual and/or automatic focusing and other capabilities. Camera 12 can be in communication with conditioning system 16 or any of the component of image data collection system 10 to provide the sets of images 20 for further analysis, examination, identification, and/or conditioning before being added to image data 52 of corpus 22.

Light source 14 can be any source of different wavelengths of light that can, for example, display ultraviolet light through infrared light individually at item 18 (so as to illuminate item 18) while each image 20A-20C of set of images 20 is captured by camera 12. Light source 14 can be in communication with camera 12 to operate in conjunction to provide a wavelength (or a band of wavelengths) of light, capture an image 20 of item 18 illuminated by that wavelength (or band of wavelengths), and then switch to a different wavelength (or band of wavelengths) of light and repeat the process for other images 20A-20C to create a set of images 20.

Light source 14 can have any configuration, orientation, and/or location with respect to item 18 and/or camera 12 suitable for illuminating item 18 under various wavelengths of light. Moreover, light source 14 can be a spotlight aimed at item 18 or generally produce a "glow" of light that illuminates a larger area. Additionally, as described above, internal light source 32 of camera 12 can have the same capabilities as light source 14 that is external to, and potentially distant from, camera 12. Light source 14 can have a configuration that includes more than one light source, and each light source can provide light having a specific wavelength and/or a band of specific wavelengths, with different light sources 14 turning on and off depending on the wavelength(s) of light desired to be captured by camera 12. One or multiple light sources 14 can be positioned in conjunction with one or multiple cameras 12 to captures sets of images 20 from different viewpoints with respect to item 18 (in addition to the repositioning of item 18 between capturing of sets of images 20 and/or alternative to repositioning item 18). Light source 14 can be in communication with conditioning system 16 to receive instructions as to the wavelengths of light to emit and when to emit the particular wavelengths of light. For example, conditioning system 16 can function to provide a schedule to camera 12 and/or light source 14 to capture item 18 under different wavelengths of light as light source 14 illuminates item 18 with different wavelengths.

Each image 20A-20C captured by camera 12 can be different from other images 20A-20C within the set by capturing item 18 as illuminated by any number of wavelengths of light. For example, one image 20A-20C can capture item 18 under wavelength $10^{-6}$ meters (UV light), and then capture another image 20A-20C of item 18 under wavelength $10^{-5}$ meters, which is also UV light but different than the first image. Thus, each set of images 20 can include any number of images 20A-20C capturing item 18 illuminated by any specific wavelengths of light.

Item 18 can be any component, product, and/or object for which detection of defect 50 is desired. In one example, item 18 is an anodized metal for which system 10 is intended to capture images 20A-20C of defects 50 in the anodized metal, either on the surface or within the object. System 10 provides corpus 22 having image data 52 regarding item 18 to machine-learning training module 24 for training machine-learning model 28 to detect defects 50 in objects/products that can be similar to item 18. For example, machine-learning model 28 can be trained to detect defects 50 in many objects as those objects proceed/move along an assembly line or are otherwise viewable by machine-learning model 28 or the images of those objects are provided to machine-learning model 28. In this example, both the item 18 displayed in images 20A-20C captured by camera 12 and the objects examined by machine-learning model 28 are constructed from and/or include anodized metal. In another example, the items 18 in system 10 and/or the objects examined by machine-learning model 28 have a different size and/or configuration and/or are constructed by different materials. Item 18 can have any size, configuration, orientation, material, etc. However, item 18 should be configured to allow for imaging by camera 12 such that any defects 50 in item 18 are shown in one of images 20A-20C in one of the sets of images 20 that are captured by camera 12 of the particular item 18. Item 18 can sit upon or otherwise be held in place by any mount and/or apparatus, and the mount can be configured to rotate item 18 after a set of images 20 is captured to allow for the capture of another set of images 20 having a different viewpoint of item 18 as compared to the previous set of images 20. Defects 50 can be any irregularities in item 18 that are undesirable, such as scratches, cracks, holes, warping, porosity, caking, coking, segregation, nonuniformity, shrinkage, and/or other defects. Additionally, defects 50 can be on a surface of item 18 or can be within item 18 so as to unviewable with the naked eye but viewable under a wavelength of light other than the visible light spectrum.

Camera 12 can capture one or multiple sets of images 20, with one set of images 20 able to include one or multiple visible light images 20A, one or multiple IR images 20B, and/or one or multiple UV images 20C. One set of images 20 is different from another set of images 20 because each image in one set of images 20 have the same viewpoint of item 18 as other images in that set of images 20. Thus, one set of images 20 can include many images 20A-20C capturing item 18 under different wavelengths of light but from the same viewpoint. In one example, one set of images 20 can include ten images 20A capturing item 18 illuminated by wavelengths within the visible light spectrum, fifteen images 20B capturing item 18 illuminated by wavelengths within the infrared light spectrum, and eighteen images 20C capturing item 18 illuminated by wavelengths within the ultraviolet light spectrum. Within each spectrum of light, the images can capture item 18 as illuminated by different wavelengths. For example, image 20C can capture item 18 under wavelength $10^{-6}$ meters (UV light), and then capture another image 20C of item 18 under wavelength $10^{-5}$ meters, which is also UV light but different than the first image 20C. Thus, in this example, set of images 20 includes forty-three images 20A-20C all having the same viewpoint of item 18. Another set of images 20 (having a different viewpoint from the first set) can include any number of different images 20A-20C capturing the same or a different item 18 under different wavelengths of light.

Images 20A-20C can be captured and/or communicated digitally or via other methods, such as photographic film. Images 20A-20C can be communicated (e.g., digitally sent) to conditioning system 16 individually as camera 12 captures each image 20A-20C or collectively as a set of images 20 is completely captured by camera 12. Individual images 20A-20C and/or the set of images 20 can include other information along with the image, such as information identifying item 18, identifying that the particular image 20A-20C is part of a set of images 20, identifying the wavelength(s) at which item 18 is captured, a timestamp reflecting the time when the particular image 20A-20C was captured, and/or other information.

The set of images 20 and/or other information can be provided to conditioning system 16. Conditioning system 16 can provide instructions to camera 12, light source 14, and/or other components of image data collection system 10 to control the operation of those components to collect sets of images 20 of item 18 (and/or more than one item 18) and communicate those sets of images 20 to conditioning system 16. As described above, conditioning system 16 can include processor 34, memory 36, and/or user interface 38, among other components described below.

Examine module 40 is configured to examine at least one image 20A-20C of the set of images 20 to determine whether the image 20A-20C shows at least one defect 50 in item 18. Examine module 40 can include, be in communication with, and/or use any of processor 34, memory 36, user interface 38, and/or any other components of conditioning system 16 and/or other components of system 10 (such as camera 12) to access sets of images 20 and examine sets of images 20 for defects 50 in items 18. Examine module 40 can allow for examination of all images 20A-20C of the set of images 20 simultaneously for defects 50 in item 18, or examine module 40 can examine images 20A-20C individually. Moreover, examine module 40 can include and/or use user interface 38 to allow for an operator to manually examine one or multiple images 20A-20C. Alternatively and/or additionally, examine module 40 can be configured to automatically examine images 20A-20C by a machine-learning model or another software program and/or computer hardware suitable for examination of items 18 for defects 50, and examine module 40 can be configured to automatically examine images 20A-20C in response to conditioning system 16 receiving set of images 20 from camera 12. Examine module 40 can be configured to highlight or otherwise emphasize any irregularities in/on item 18.

The examination/review of images 20A-20C by examine module 40 can reveal that no defect 50 in item 18 is shown in any of the images 20A-20C (e.g., all images 20A-20C of the set of images 20 are examined and none show a defect 50 in item 18). In response to examine module 40 determining that no defect is shown in any of images 20A-20C in the set of images 20, for example, identify module 42 and designate module 44 do not review any images 20A-20C of the set of images 20.

Identify module 42 is configured to identify or otherwise determine, in response to at least one defect 50 being shown in the image 20A-20C, a location of the at least one defect 50 in item 18 as shown on/in the image 20A-20C. Identify module 42 can include, be in communication with, and/or use any of processor 34, memory 36, user interface 38, and/or any other components of conditioning system 16 and/or other components of system 10 (such as camera 12) to access sets of images 20 and identify the locations of defects 50 shown on/in the image(s) 20A-20C. Similar to examine module 40, identify module 42 can allow for the identification of the location of defects 50 as shown in all images 20A-20C of the set of images 20 simultaneously, or identify module 40 can identify locations of defects 50 in images 20A-20C individually. The identification of the locations of all defects 50 shown in each image 20A-20C can be performed at the same time as the examination of that image 20A-20C by examine module 40 or can be performed after the image 20A-20C has been examined to determine if the image 20A-20C shows a defect 50 in item 18. As with examine module 40, identify module 42 can include and/or use user interface 38 to allow for an operator to manually identify the locations of defects 50 in images 20A-20C. Alternatively and/or additionally, identify module 42 can be configured to automatically identify the location of defects 50 shown in images 20A-20C by a machine-learning model or another software program and/or computer hardware, and identify module 42 can be configured to automatically determine the locations of defects 50 shown in images 20A-20C in response to conditioning system 16 receiving set of images 20 from camera 12 and/or examine module 40 determining that a defect 50 is shown in the image 20A-20C. Identify module 42 can tag the location of defects 50 shown in the image 20A-20C by highlighting, circling, or otherwise emphasizing the defect 50 on the image 20A-20C, by recording the location in metadata or other data associated with the image 20A-20C, or by other methods.

Designate module 44 is configured to define, designate, earmark, and/or otherwise note the location of defect 50 (as identified by identify module 42) in the other images 20A-20C of set of images 20 to which the examined image 20A-20C belongs so that all images 20A-20C in the set of images 20 identify the location of the defect 50 (even if the particular image does not show the defect 50 in item 18). Because all images 20A-20C in set of images 20 have the same viewpoint, the identification of the location of one defect 50 as shown in one image 20A-20C in the set of images 20 also means that each particular defect 50 is also located in the other images 20A-20C in the set of images 20, even if that defect 50 is not viewable in those images 20A-20C due to those images 20A-20C capturing item 18 under different wavelengths of light. For example, a defect 50 can be shown in IR images 20B but not in UV images 20C even though all images 20A-20C have the same viewpoint. Thus, designate module 44 applies/notes the location of defect 50 as shown in one image to all other images of the set of images 20, creating a set of images 20 that are positive indicators of defects 50 (e.g., show at least one defect 50) to be used by machine-learning training module 24 to train machine-learning model 28.

Designate module 44 can include, be in communication with, and/or use any of processor 34, memory 36, user interface 38, and/or any other components of conditioning system 16 and/or components of system 10 to access set of images 20, receive information as to the identify of the location of defect 50 as determined by identify module 42, and/or designate that location of defect 50 on the other images 20A-20C in the set of images 20. Designate module 44 can designate the location of defect 50 in the other images 20A-20C in set of images 20 all at one time (i.e., simultaneously) or designate the location in the other images 20A-20C individually. Moreover, designate module 44 can include and/or use user interface 38 to allow for an operator to manually designate the location of defect 50 in the other images 20A-20C. Alternatively and/or additionally, designate module 44 can be configured to automatically designate/note the location of defect 50 in the other images 20A-20C in response to conditioning system 16 (e.g., identify module 42) identifying a location of a defect 50 in any of images 20A-20C in the set of images 20. The location of defect 50 in the other images 20A-20C can be denoted similarly to how identify module 42 identifies and/or notes the location of the defect 50, such by highlighting, circling, or otherwise emphasizing the location on the other images 20A-20C, by recording the location in metadata or other data associated with the images 20A-20C, or by other methods.

During or after examining one or multiple images 20A-20C of the set of images 20 to determine if item 18 contains at least one defect 50 (by examine module 40), label module 46 can classify, denote, define, and/or otherwise label the set of images 20 and/or one or all images 20A-20C in the set of images 20 as either showing at least one defect 50 or not showing at least one defect 50. This labeling, by label module 46, can aid in conditioning the images 20A-20C for use by machine-learning training module 24 to train machine-learning model 28 by having corpus 22 with image data 52 that includes labeled/conditioned images of both images 20A-20C of one set of images 20 that show defects 50 and images 20A-20C of another set of images 20 that do not show defects 50. Image data 52 can be data that includes one or multiple sets of images 20 that have been labeled/conditioned and/or that have not been labeled/conditioned, as well as other images and/or data for use in training machine-learning model 28.

Label module 46 can include, be in communication with, and/or use any of processor 34, memory 36, user interface 38, and/or any other components of conditioning system 16 and/or components of system 10 to label images 20A-20C in the set of images 20. Label module 46 can label all images 20A-20C in the set of images 20 simultaneously (e.g., all at one time or collectively at once) or label each of the images 20A-20C individually. Moreover, label module 46 can include and/or use user interface 38 to allow for an operator to manually label the images 20A-20C. Alternatively and/or additionally, label module 46 can be configured to automatically label the images 20A-20C in response to examine module 40 examining, reviewing, and/or determining that at least one defect 50 is or is not shown in any of images 20A-20C in the set of images 20. The labeling of the images 20A-20C of the set of images 20 can be via any method and/or marking, such as by noting on the image that at least one defect 50 or no defect is shown, recording the presence or no presence of a defect in metadata or other data associated with the images 20A-20C, or by other methods.

Communication module 48 can include, be in communication with, and/or use any of processor 34, memory 36, user interface 38, and/or any other components of conditioning system 16 and/or components of system 10 to send, provide, or otherwise communicate conditioned set of images 20 (e.g., images 20A-20C that have been examined, the locations of any defects 50 identified in the images 20A-20C, those locations designated in the other images 20A-20C in the set of images 20, and/or labeled as showing a defect 50 or not showing a defect) to machine-learning training module 24. The conditioned set of images 20 can be added/introduced to corpus 22 as image data 52, with corpus 22 only including the image data 52 or including other information useful for training machine-learning model 28. Communication module 48 can include or use any form of communication, such as wired or wireless communication, to provide image data 52 to machine-learning training module 24. Communication module 48 can include and/or use user interface 38 to allow for an operator to manually provide corpus 22 having image data 52 to machine-learning training module 24. Alternatively and/or additionally, communication module 48 can be configured to automatically provide/send image data 52 (and/or corpus 22) to machine-learning training module 24 in response to the completion of any of examining images 20A-20C, identifying the location of at least one defect 50 in images 20A-20C, designating those locations in other images 20A-20C in set of images 20, and labeling the set of images 20 as showing a defect 50 or showing no defect.

As detailed above, images 20A-20C can be conditioned (e.g., examined for defects 50, the location of each defect 50 being identified on images 20A-20C, the location designated on other images 20A-20C of the set of images 20 and/or each image 20A-20C, and/or the set of images 20 being labeled as showing a defect 40 or not showing a defect 50) and added as image data 52 to corpus 22, which can be a collection of data, rules, instructions, and/or other information useful to the training of machine-learning model 28 by machine-learning training module 24. Corpus 22 can be a digital computer file or any other method of storing and/or conveying information. Corpus 22 can be stored in memory 36 of conditioning system 16 during formulation and/or introduction of information to corpus 22, such as the addition of image data 52 (e.g., new sets of images 20) to corpus 22.

Machine-learning training module 24 is configured to train machine-learning module 28 using corpus 22 having image data 52. Machine-learning training module 24 can include, be in communication with, and/or use any of the components of conditioning system 16. Image data 52, which includes sets of images 20, can be used by machine-learning training module 24 as test image data because image data 52 has sets of images 20 that show defects 50 in items 18 and sets of images 20 that show no defects in items 18. Additionally, because this test data (i.e., image data 52) includes sets of images 20 having images 20A-20C capturing many different wavelengths of light, such as visible light images 20A, IR images 20B, and/or UV images 20C, machine-learning model 28 can be trained to determine defects 50 using images of items 18 under various wavelengths of light.

Machine-learning model 28 can perform various techniques to create an algorithm (or multiple algorithms) or otherwise determine which inputs (e.g., the images 20A-20C) are most indicative of predicting the outputs (e.g., whether item 18 includes one or multiple defects 50). These techniques can include classification techniques (e.g., support vector machines, discriminant analysis, naïve bayes, nearest neighbor), regression techniques (e.g., linear regression, GLM, SVR, GPR, ensemble methods, decision trees, random decision forest, random forest, neural networks), clustering (e.g., K-means, K-medoids, fuzzy C-means, hierarchical, Gaussian mixture, neural networks, hidden Markov models), and/or other techniques, such as extreme gradient boosting (XGBoost), logistic regression, and time series forecasting. Machine-learning model 28 can determine and/or weight the importance of each input using coefficients that are increased and/or decreased to refine the accuracy of the prediction by machine-learning model 28. Other techniques and/or methods of training machine-learning model 28 can be used by machine-learning training module 24 to train machine-learning models 28. Machine-learning model 28 can use computer vision 54 on images 20A-20C to determine if one or multiple defects 50 are present in/on item 18 and/or, in practice, machine-learning module 28 can use computer vision 54 to collect and analyze images of an object to determine if a defect is in/on the object. Computer vision 54, as used by machine-learning model 28, can include methods and/or software for acquiring, processing, analyzing, and/or understanding the images and extracting data, such as whether (and where) a defect is present. Computer vision 54 and/or machine-learning model 28 can include and/or use other methods, software, programs, etc. and have other capabilities not expressly disclosed herein.

FIG. 2 is an example flow chart of image data collection and conditioning process 100 as performed by, for example, image data collection system 10 and/or conditioning system 16. While process 100 is described herein as being used with regards to image data collection system 10 and/or conditioning system 16, process 100 can be performed by any system having any components, capabilities, configurations, and/or functionalities suitable for performing process 100. Additionally, process 100 can include other steps not expressly disclosed herein and/or can include performing the disclosed steps in any order and/or multiple times as is desired and/or necessary to condition sets of images 20 for use by machine-learning training module 24 to train machine-learning model 28. Moreover, process 100 can be performed partially or entirely in a digital environment by and/or within image data collection system 10 and/or conditioning system 16, such as by processor 34 and saved in memory 36.

Process 100 can include step 102, which is shining light on item 18 by light source 14 and/or internal light source 32. The light shined on item 18 by light source 14 and/or internal light source 32 in step 102 can be configured to shine one band (e.g., range) of wavelengths/light and/or shine multiple or all bands of wavelengths/light ranging from ultraviolet light to infrared light. Step 102 can be performed multiple times with the wavelength of light (or band of wavelengths) being shone on item 18 changing each time (e.g., after step 104 is performed and an image is captured/taken), or step 102 can be performed once with all wavelengths of light (e.g., ultraviolet through infrared light) being shone on item 18 simultaneously. The light can be shone for an extended period of time (e.g., throughout the entirety of process 100) or for a small amount of time, such as only during step 104 (capturing/taking the images). Step 102 can be performed by one or multiple light sources 14/32 positioned at differing locations surrounding item 18 and/or illuminating item 18. Step 102 can be performed manually by setting up and/or turning on light source 14 and/or internal light source 32 or automatically in response to the positioning of item 18, an instruction that process 100 is to begin, an instruction that camera 12 is about to capture images 20A-20A (e.g., about to perform step 104), and/or other factors or events.

Next, process 100 includes step 104, which is capturing a first set of images 20. Step 104 can include taking multiple photos/images by camera 12 from the same viewpoint, with each image 20A-20C capturing item 18 being illuminated by a different wavelength (or a band of wavelengths). Step 104, as performed by camera 12, can include taking multiple images in quick succession and/or simultaneously (with the frequency at which images 20A-20C are captured being dependent on the light shone on item 18 to allow for the capture of images 20A-20C having different wavelengths of light). Step 104 can be performed manually by an operator taking images 20A-20C, or step 104 can be performed automatically and/or as instructed by, for example, conditioning system 16 providing instructions to camera 12 to capture images 20A-20C. The instructions can also be provided to light source 14 and/or internal light source 32 in conjunction with camera 12. Step 104 can include communicating the first set of images 20 to conditioning system 16 and/or another system for processing and/or conditioning images 20A-20C for use by machine-learning training module 24.

Step 106 can include examining one image 20A-20C of the first set of images 20 for one or multiple defects 50 in item 18. Step 106 can be performed by examine module 40 of conditioning system 16. Examine module 40 can access at least one of images 20A-20C by being in communication with camera 12 and/or via images 20A-20C being stored in memory 36 and/or at another location. Step 106 can include examining only one image 20A-20C of the first set of images 20 for defects 50 in item 18. If no defect 50 is found, then step 106 can be repeated on another image 20A-20C of the first set of images 20 until either a defect 50 is found in one image 20A-20C of the first set of images 20 or no defect is found. If no defect is found, process 100 continues with step 116, described below. If a defect 50 is found in any of images 20A-20C of the first set of images 20, then process 100 proceeds to step 108. Step 106 can be performed manually by an operator with assistance from any of processor 34, memory 36, and/or user interface 38, with the operator examining images 20A-20C to determine if one or multiple defects 50 are shown in item 18. Additionally and/or alternatively, step 106 can be performed automatically by a machine-learning model or another software program and/or computer hardware suitable for examination of items 18 for defects 50, and process 100 can include automatically performing step 106 in response to conditioning system 16 receiving the first set of images 20 from camera 12. Step 106 can also include highlighting or otherwise emphasizing on image(s) 20A-20C any irregularities in item 18.

If a defect 50 is found during the examination of at least one image 20A-20C of the first set of images 20 as performed in step 106, process 100 can include step 108, which is to identify the location of the one or multiple defects 50 in the frame/viewpoint of the at least one image 20A-20C examined in step 106. Step 108 can be performed on any images 20A-20C for which the examination in step 106 was performed that revealed/determined a defect 50 is present/shown in those images 20A-20C, and the identification in step 108 can be performed individually or simultaneously with regards to the images 20A-20C and/or with regards to the performance of step 106 (e.g., at the same time or shortly after the performance of step 106 for each image 20A-20C examined). Step 108 can be performed manually by an operator with assistance from any of processor 34, memory 36, and/or user interface 38, with the operator identifying the location of at least one defect 50 shown in/on the one image 20A-20C. Additionally and/or alternatively, step 108 can be performed automatically by a machine-learning model or other software programs and/or computer hardware suitable for identifying the location of the defects 50, and process 100 can include automatically performing step 108 in response to conditioning system 16 receiving the first set of images 20 from camera 12 and/or in response to the examination of one or multiple images 20A-20C. Step 108 can be performed multiple times on each image 20A-20C depending on the number of defects 50 in item 18 that is shown in each image 20A-20C.

Next, in response to step 106 determining that a defect 50 in item 18 is shown in the image 20A-20C, process 100 can include step 110, which is designating the location (as identified in step 108) of the defects 50 on the other images 20A-20C in the first set of images 20. The location designated in the other images 20A-20C of the first set of images 20 corresponds to the location that is identified in step 108. Step 110 can be performed by designate module 44, which can be configured to define, designate, earmark, and/or otherwise note the location of defect 50 in the other images 20A-20C of the first set of images 20 to which the examined image 20A-20C belongs so that all images 20A-20C in the first set of images 20 identify the location of the defect 50 (even if a defect is not viewable in that particular image). Because all images 20A-20C in the first set of images 20 have the same viewpoint, the identification of the location of one defect 50 in step 108 as shown in one image 20A-20C in the first set of images 20 also means that each particular defect 50 is also located in the other images 20A-20C in the first set of images 20, even if that defect 50 is not viewable in those images 20A-20C (because that defect 50 may not be viewable under that particular wavelength of light). Step 110 can be performed on all other images 20A-20C of the first set of images 20 simultaneously (e.g., all at one time) or individually in series. Step 110 can be performed manually by an operator with assistance from any of processor 34, memory 3, and/or user interface 38, with the operator designating the location of defects 50 in the other images 20A-20C in the first set of images 20. Additionally and/or alternatively, step 110 can be performed automatically by any of the components of conditioning system 16, and the automatic performance of step 110 can be in response to the identification of the location of one or multiple defects 50 in step 108. The location of defect 50 in the other images 20A-20C can be denoted similarly to how step 108 identifies and/or notes the location of the defect 50, such by highlighting, circling, or otherwise emphasizing the location on the other images 20A-20C, by recording the location in metadata or other data associated with the images 20A-20C, or by other methods.

Next, process 100 can include step 112, which is to label each image 20A-20C and/or the first set of images 20 as having at least one defect 50. This step 112 aids in conditioning the images 20A-20C for use by machine-learning training module 24 to train machine-learning model 28 by having corpus 22 with image data 52 that includes labeled images 20A-20C that show defects 50 as well as labeled images 20A-20C that do not show defects (as performed in step 116). Step 112 can be performed manually by an operator with assistance from processor 34, memory 36, and/or user interface 38. Alternatively and/or additionally, step 112 can be performed automatically by any of the components of conditioning system 16, and the automatic performance of step 112 can be in response to the performance of any of steps 106, 108, and/or 110. The labeling of the images 20A-20C of the set of images 20 can be via any method and/or marking, such as by noting on the image that at least one defect 50 is shown, recording the presence of a defect in metadata or other data associated with the images 20A-20C, or by other methods.

In response to the examination of one image 20A-20C in the first set of images 20 (step 106) revealing that no defect 50 in item 18 is shown in that particular image, process 100 can include step 114, which is to examine one, multiple, or all images 20A-20C in the first set of images 20 to determine if a defect 50 is present/shown in any of those images 20A-20C. Alternatively, step 114 can be performed even if a defect 50 is found upon examination of any images 20A-20C because some defects 50 may only be viewable/visible under a particular wavelength (or band of wavelengths) of light that is captured only by one or a few images 20A-20C of the first set of images 20. The performance of step 114 can be similar to that of step 106 as described above.

In response to the examination of all images 20A-20C in the first set of images 20 (step 114) revealing that no defect 50 in item 18 is viewable in any images 20A-20C, step 116 can include labeling each image 20A-20C and/or the first set of images 20 as showing no defect. Step 116 is similar to step 112 as described above except that each image 20A-20C is labeled as showing no defect as opposed to being labeled as showing at least one defect 50. As with step 112 above, step 116 aids in conditioning the images 20A-20C for use by machine-learning training module 24 to train machine-learning model 28 by having corpus 22 with image data 52 that includes labeled images 20A-20C that do not show defects (in addition to image data 52 that includes labeled images 20A-20C that do show defects 50). Step 116 can be performed manually by an operator with assistance from processor 34, memory 36, and/or user interface 38. Alternatively and/or additionally, step 116 can be performed automatically by any of the components of conditioning system 16 (such as label module 46), and the automatic performance of step 112 can be in response to the performance of any of steps 106, 108, 110, and/or 114. The labeling of the images 20A-20C of the set of images 20 can be via any method and/or marking, such as by noting on the image that no defect is shown, recording that no defect is shown/present in metadata or other data associated with the images 20A-20C, or by other methods.

Process 100 can further include step 118, which is adding the conditioned first set of images 20 to corpus 22 having image data 52. Corpus 22 having image data 52 can be stored, saved, or otherwise contained within memory 36 or other digital storage media. Step 118 can ensure that the first set of images 20 that has been conditioned (e.g., has been examined, has had the location of defects 50 identified, and has had that location designated in other images 20A-20C of the first set of images 20) is included in the materials, data, information, etc. that is used to train machine-learning model 28. The first set of images 20 (and other sets of images 20) can be stored or otherwise saved in corpus 22 during performance of steps 106, 108, 110, 112, 114, and/or 116 such that step 118 may not be needed by process 100 since the first set of images 20 are already within corpus 22. Additionally, step 118 can be performed at any time during process 100, such as immediately after step 104 (capturing the first set of images 20). In this example, the first set of images 20 can be added to corpus 22 after being received by conditioning system 16 from camera 12. In another example, the first set of images 20 are first saved/stored in memory 36 during which steps 106-116 are performed and then the labeled/conditioned first set of images 20 are added to corpus 22. Step 118 can be performed manually by an operator with assistance from processor 34, memory 36, and/or user interface 38 by saving or otherwise moving the first set of images 20 to corpus 22. Alternatively and/or additionally, step 118 can be performed automatically by any of the components of conditioning system 16, and the automatic performance of step 112 can be in response to performance of any of steps 106, 108, 110, 112, 114, and/or 116.

The organization of the sets of images 20 (including multiple sets of images 20) in corpus 22 can be via any method, including separating images 20A-20C into groups with one for images in which defects 50 are viewable and another for images in which defects 50 are not viewable. In another example, images 20A-20C can be separated into two groups with one for images in which the label for the set of images indicates that at least one defect is shown (even if some particular images 20A-20C in that set of images 20 do not show a defect, as described above) and another in which the label for the set of images indicates that no defect is shown. Corpus 22 having image data 52 can include organizing the images in another way, such as by those images 20A-20C that have been conditioned/labeled and those images 20A-20C that have not been conditioned/labeled or have only experienced a subset of steps 106-116.

Process 100 can include step 120, which is to provide corpus 22 having image data 52 to machine-learning model 28 and/or machine-learning training module 24 to train machine-learning model 28 to determine whether item 18 (or products, components, items, etc. similar to item 18) has any defects 50. Step 120 can be performed by communication module 48 or another component of conditioning system 16. Step 120 can be performed at any time throughout process 100, and can be performed automatically in response to the performance of any of the other steps in process 100.

Process 100 can further include step 122, which is rotating item 18 and repeating all or some of steps 102-120. Step 122 can include rotating item 18 from an orientation at which the first set of images 20 are captured (e.g., a first viewpoint) to a different orientation having a second viewpoint. This provides for a second set of images 20 that have a different viewpoint of item 18 as compared to the first set of images 20. The second viewpoint allows for images 20A-20C of the second set of images 20 to show at least one defect 50 that may not otherwise be viewable in the first set of images 20 having a first viewpoint of item 18. Alternatively and/or additionally to rotating item 18, step 122 can include repositioning camera 12 to have a different viewpoint of item 18 as compared to the position of camera 12 when capturing the first set of images 20, and/or step 122 can include capturing the second set of images 20 using a different camera 12 in a different position as compared to the position of camera 12 when capturing the first set of images 20. This allows for the capture of the second set of images 20 having a different viewpoint of item 18. System 10 can include a mount and/or other component for rotating item 18, and the mount can be in communication with conditioning system 16 to receive instructions regarding the rotation of item 18 in step 122. Thus, the rotation of item 18 in step 122 can be performed automatically in response to any of steps 102-120, such as in response to the capture of the first/previous set of images 20 (step 102). Step 122 can be repeated any number of times for each item 18 to capture multiple sets of images 20 from multiple different viewpoints (e.g., each having a different viewpoint of item 18).

Next, process 100 can include step 124, which is repeating steps 102-122 for Nth set of images 20 of Nth number of items 18. It may be desirable to capture sets of images 20 for multiple different items 18. Thus, process 100 can include replacing item 18 with a different item 18 and repeating one, multiple, or all of steps 102-122 for a different item 18 than that which was described with regards to steps 102-122 above. The different item 18 can have the same or a different configuration, orientation, construction material, size, etc. than the previous item 18. The repeat of steps 102-122 can be performed similarly to the performance of those steps the first time (e.g., as described above) and/or can be performed manually, automatically, and/or in a different order than that described above.

At any point during process 100, step 126 can be performed, which is to train machine-learning model 28 using corpus 22. Step 126 can be performed by machine-learning module 24, and can be performed automatically in response to receiving a portion or the entirety of corpus 22 and/or any image data 52 having one or multiple images 20A-20C from one or multiple sets of images 20. Step 126 can be performed using any machine-learning training techniques known by one of skill in the art. The training of machine-learning model 28 can be performed continuously as additional image data 52 is received from conditioning system 16 and/or as additional image data 52 is received from the operation of machine-learning model 28.

Image data 52 in corpus 22 having sets of images 20 including images capturing item 18 under various lights/wavelengths, such as UV light (UV images 20C), IR light (IR images 20B), and/or visible light (visible light images 20A), has important advantages. Some defects 50 may not be viewable under visible light, but instead are viewable only under other types of light. Thus, machine-learning model 28 that is trained using this image data 52 can identify defects 50 from images 20A-20C having/capturing a wide range of wavelengths, even if those defects 50 are not viewable under visible light, thereby increasing the accuracy of the machine-learning model 28 to identify defects 50.

The following are nonlimiting examples of the systems and related processes for collecting and/or conditioning images for use in training a machine-learning model:

A method of collecting and conditioning image data of an item for use in training a machine-learning model to detect at least one defect is disclosed herein. The method can include capturing a first set of images by a first camera with each image of the first set of images having a first viewpoint of the item that is the same viewpoint as the other images in the first set of images, wherein the first set of images includes images capturing the item as illuminated by various wavelengths of light including ultraviolet light, infrared light, and visible light. The method can further include examining one image of the first set of images to determine if the item contains at least one defect; identifying, in response to the one image showing the item contains at least one defect, a first location of the at least one defect on the one image; designating the first location, which corresponds to the at least one defect, on the other images of the first set of images so that all images in the first set of images identify the first location; and adding the first set of images to a corpus having the image data for use in training the machine-learning model.

The method of the preceding paragraph can optionally include, additionally and/or alternatively, any one or more of the following features, configurations, steps, and/or additional components:

The method further includes examining each image of the first set of images to determine if the item contains at least one defect and labeling, in response to all images in the first set of images not showing at least one defect in the item, the first set of images as showing no defect.

The method further includes using the image data to train the machine-learning model to identify defects in components similar to the item.

The method further includes that machine-learning model includes computer vision.

The method further includes labeling the first set of images as showing at least one defect.

The method further includes capturing a second set of images of the item by a second camera with the second set of images having second viewpoint of the item that is the same viewpoint as the other images in the second set of images, wherein the second set of images includes images capturing the item as illuminated by various wavelengths of light including ultraviolet light, infrared light, and visible light; examining one image of the second set of images to determine if the item contains at least one defect; designating, in response to the one image showing the item contains at least one defect, a second location of the at least one defect on each image of the second set of images; and adding the second set of images to the image data for use in training the machine-learning model.

The method further includes that the first camera and the second camera are the same so as to be in the same position.

The method further includes rotating the item from an orientation in the first viewpoint to a different orientation before capturing the second set of images having the second viewpoint.

The method further includes that the second camera is in a different position relative to the item so as to capture the second set of images from the second viewpoint that is different from the first viewpoint.

The method further includes shining ultraviolet light at the item by an ultraviolet light source and capturing a first image of the first set of images of the item with the first image showing the item as illuminated by ultraviolet light.

The method further includes shining infrared light at the item by an infrared light source and capturing a second image of the first set of images of the item with the second image showing the item as illuminated by infrared light.

The method further includes shining visible light at the item and capturing a third image of the first set of images of the item with the third image showing the item as illuminated by visible light.

The method further includes that the item has an anodized metal surface.

The method further includes that step of designating the first location on the other images of the first set of images is performed by a computer processor.

The method further includes that the step of designating the first location on the other images of the first set of images is performed automatically by the computer processor in response to the identification of the first location on one image of the first set of images.

A system for collecting and conditioning image data of an item for use in training a machine-learning model to detect at least one defect is disclosed herein. The system can include a light source configured to shine light having different wavelengths onto the item, the light including ultraviolet light, infrared light, and visible light and a camera configured to capture a first set of images having a first viewpoint of the item that is the same viewpoint for each image in the first set of images, wherein the first set of images includes images captured at various wavelengths of light including ultraviolet light, infrared light, and visible light. The system can further include a user interface in communication with the camera to receive at least one of the first set of images, the user interface enabling examination of one image of the first set of images to determine if the item contains at least one defect and identification, in response to the determination that the one image shows at least one defect, of a first location of the at least one defect on the one image; a computer processor in communication with the user interface and configured to designate the first location on the other images of the first set of images so that all images in the first set of images identify the first location; and a corpus having image data that includes the first set of images with the corpus being used in training the machine-learning model.

The system of the preceding paragraph can optionally include, additionally and/or alternatively, any one or more of the following features, configurations, steps, and/or additional components:

The system further includes that the designation of the first location on the other images of the first set of images is performed automatically by the computer processor in response to the identification of the first location on one image of the first set of images.

The system further includes that the computer processor labels the first set of images as showing at least one defect.

The system further includes that the machine-learning model is provided the corpus having the image data for use in training the machine-learning model to identify defects in components similar to the item.

The method further includes that the computer processor, in response to the examination of all images of the first set of images resulting in a determination that no defects in the item are shown in the images, labels the first set of images as showing no defect.

The method further includes that the light source and the camera are contained within a housing.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of collecting and conditioning image data of an item for use in training a machine-learning model to detect at least one defect, the method comprising:
   capturing a first set of images by a first camera with each image of the first set of images having a first viewpoint of the item that is the same viewpoint as the other images in the first set of images, wherein the first set of images includes images capturing the item as illuminated by various wavelengths of light including ultraviolet light, infrared light, and visible light;
   examining one image of the first set of images to determine if the item contains at least one defect;
   identifying, in response to the one image showing the item contains at least one defect, a first location of the at least one defect on the one image;
   designating the first location, which corresponds to the at least one defect, on the other images of the first set of images so that all images in the first set of images identify the first location; and
   adding the first set of images to a corpus having the image data for use in training the machine-learning model.

2. The method of claim 1, further comprising:
   examining each image of the first set of images to determine if the item contains at least one defect; and
   labeling, in response to all images in the first set of images not showing at least one defect in the item, the first set of images as showing no defect.

3. The method of claim 2, further comprising:
   using the image data to train the machine-learning model to identify defects in components similar to the item.

4. The method of claim 3, wherein the machine-learning model includes computer vision.

5. The method of claim 1, further comprising:
   labeling the first set of images as showing at least one defect.

6. The method of claim 1, further comprising:
   capturing a second set of images of the item by a second camera with the second set of images having second viewpoint of the item that is the same viewpoint as the other images in the second set of images, wherein the second set of images includes images capturing the item as illuminated by various wavelengths of light including ultraviolet light, infrared light, and visible light;
   examining one image of the second set of images to determine if the item contains at least one defect;
   designating, in response to the one image showing the item contains at least one defect, a second location of the at least one defect on each image of the second set of images; and
   adding the second set of images to the image data for use in training the machine-learning model.

7. The method of claim 6, wherein the first camera and the second camera are the same so as to be in the same position, the method further comprising:
   rotating the item from an orientation in the first viewpoint to a different orientation before capturing the second set of images having the second viewpoint.

8. The method of claim 6, wherein the second camera is in a different position relative to the item so as to capture the second set of images from the second viewpoint that is different from the first viewpoint.

9. The method of claim 1, further comprising:
   shining ultraviolet light at the item by an ultraviolet light source; and
   capturing a first image of the first set of images of the item with the first image showing the item as illuminated by ultraviolet light.

10. The method of claim 9, further comprising:
    shining infrared light at the item by an infrared light source; and
    capturing a second image of the first set of images of the item with the second image showing the item as illuminated by infrared light.

11. The method of claim 10, further comprising:
    shining visible light at the item; and
    capturing a third image of the first set of images of the item with the third image showing the item as illuminated by visible light.

12. The method of claim 1, wherein the item has an anodized metal surface.

13. The method of claim 1, wherein the step of designating the first location on the other images of the first set of images is performed by a computer processor.

14. The method of claim 13, wherein the step of designating the first location on the other images of the first set of images is performed automatically by the computer processor in response to the identification of the first location on one image of the first set of images.

15. A system for collecting and conditioning image data of an item for use in training a machine-learning model to detect at least one defect, the system comprising:
    a light source configured to shine light having different wavelengths onto the item, the light including ultraviolet light, infrared light, and visible light;

a camera configured to capture a first set of images having a first viewpoint of the item that is the same viewpoint for each image in the first set of images, wherein the first set of images includes images captured at various wavelengths of light including ultraviolet light, infrared light, and visible light;

a user interface in communication with the camera to receive at least one of the first set of images, the user interface enabling examination of one image of the first set of images to determine if the item contains at least one defect and identification, in response to the determination that the one image shows at least one defect, of a first location of the at least one defect on the one image;

a computer processor in communication with the user interface and configured to designate the first location on the other images of the first set of images so that all images in the first set of images identify the first location; and a corpus having image data that includes the first set of images with the corpus being used in training the machine-learning model.

16. The system of claim 15, wherein the designation of the first location on the other images of the first set of images is performed automatically by the computer processor in response to the identification of the first location on one image of the first set of images.

17. The system of claim 15, wherein the computer processor labels the first set of images as showing at least one defect.

18. The system of claim 15, further comprising:

the machine-learning model is provided the corpus having the image data for use in training the machine-learning model to identify defects in components similar to the item.

19. The system of claim 15, wherein the computer processor, in response to the examination of all images of the first set of images resulting in a determination that no defects in the item are shown in the images, labels the first set of images as showing no defect.

20. The system of claim 15, wherein the light source and the camera are contained within a housing.

*   *   *   *   *